(12) United States Patent
Trent et al.

(10) Patent No.: US 10,935,872 B1
(45) Date of Patent: Mar. 2, 2021

(54) CAMERA COVER

(71) Applicant: JTrent, LLC, Chicago, IL (US)

(72) Inventors: Valerie Trent, Chicago, IL (US); Yuri Gallegos, Plainfield, IL (US)

(73) Assignee: JTrent, LLC, Chicago, IL (US)

( * ) Notice: Subject to any disclaimer, the term of this patent is extended or adjusted under 35 U.S.C. 154(b) by 0 days.

(21) Appl. No.: 16/164,782

(22) Filed: Oct. 18, 2018

Related U.S. Application Data

(60) Provisional application No. 62/574,032, filed on Oct. 18, 2017.

(51) Int. Cl.
*G03B 11/04* (2006.01)

(52) U.S. Cl.
CPC .................. *G03B 11/041* (2013.01)

(58) Field of Classification Search
CPC .............................. G03B 11/041; G03B 11/41
See application file for complete search history.

(56) References Cited

U.S. PATENT DOCUMENTS

| | | | | |
|---|---|---|---|---|
| 8,033,743 B2 * | 10/2011 | Suzuki | ................... | G03B 17/02 396/448 |
| 9,661,197 B2 * | 5/2017 | Clearman | ............ | H04N 5/2252 |
| 9,829,770 B1 * | 11/2017 | Gustaveson, II | ...... | G03B 11/04 |
| 10,317,776 B2 * | 6/2019 | Gustaveson, II | .... | H04N 5/2254 |
| 2004/0041935 A1 * | 3/2004 | Nagamine | ........... | H04M 1/0264 348/335 |
| 2011/0182029 A1 * | 7/2011 | Wu | ...................... | G03B 11/041 361/679.55 |
| 2014/0220269 A1 * | 8/2014 | Ogufere Ogufere | ... | B44C 5/005 428/34.1 |
| 2015/0059251 A1 * | 3/2015 | Rinner | ................. | H04B 1/3888 49/465 |
| 2016/0161830 A1 * | 6/2016 | Gonzalez Sanchez | ..................... | G06F 1/1686 396/448 |

OTHER PUBLICATIONS

Pocket, Silent. "Silent Pocket Webcam Privacy Stickers for Camera Lens Privacy (Black Out)." Amazon, Oct. 10, 2016, www.amazon.com/Silent-Pocket-Webcam-Privacy-Stickers/dp/B076C14GP5. (Year: 2016).*

Skin, Design. "DesignSkin IPhone 6 Sliding Card Holder Case, Extreme Heavy Duty Triple Layer Bumper Protection Wallet Cover with Storage Slot for Slider iPhone6—Bull Terrier." Amazon, Jun. 5, 2016, www.amazon.com/iPhone-Case-4-7-DesignSkin-Slider/dp/B01CTMIMWY. (Year: 2016).*

* cited by examiner

*Primary Examiner* — Clayton E. LaBalle
*Assistant Examiner* — Dennis Hancock
(74) *Attorney, Agent, or Firm* — Jacob W Neu; Bradley Arant Boult Cummings, LLP

(57) ABSTRACT

A permanent camera cover is disclosed herein. The camera cover includes a base attachable to a mobile device having a camera, such as a smartphone, tablet, or laptop. The base includes an aperture to permit the camera a clear view path. A cover is engageable with the base. The cover may also have an exterior decorative covering that may be removed and/or replaced.

1 Claim, 2 Drawing Sheets

CAMERA COVER

CROSS REFERENCE

This application claims the benefit of filing of U.S. provisional application No. 62/574,032, filed on Oct. 18, 2017, and which is incorporated herein by reference.

FIELD OF INVENTION

This disclosure concerns the field of mobile phone and tablet accessories, and more particularly, a removable cover for a camera on a mobile phone or computer tablet.

BACKGROUND

The technology concerns accessories and security devices for phones, laptops, other personal digital devices such as tablets and cloud-connected TVs and cameras. A particular issue with the use of smartphones, phones, laptops and personal digital tablets with cameras is the ability of a hacker to control the camera on the device, allowing the hacker to surreptitiously turn the camera on and off. In response, people have used numerous devices to cover the lens of the camera, such as stickers, sticky-notes, plastic covers, or slides. However, many of these mechanisms are not permanent, and those that are tend to be too large for use on devices that close or have a separate cover, such as laptops. What is needed, then, is a permanent device that is thin enough to work with laptops and other products with a cover or closure. The cover should easily slide or move out of the way when a user wants to use the webcam function. In addition, the device should have a replaceable cover in case the original cover is damaged, or if the user would like to add and/or replace with a decorative cover.

SUMMARY OF INVENTION

In some aspects the invention disclosed herein is a covering product for a mobile device having a camera, the covering product having a base applied to the mobile device, the base having an aperture sized to fit around the camera, a first flange and a second flange parallel to each other, and a tab extending over the aperture; a cover comprising a first hook configured to engaged with the first flange and a second hook configured to engage with the second flange when the cover is engaged with the base; and an exterior surface covering having an ornamental surface and detachable from the cover.

In other aspects, the invention disclosed herein is a covering product for a mobile device having a camera, the covering product having a base applied to the mobile device, the base having an aperture sized to fit around the camera; a cover removably attached to the base; and an exterior surface covering.

BRIEF DESCRIPTION OF FIGS

DETAILED DESCRIPTION

A permanent camera cover 2 is disclosed herein. The cover 2 is preferably made from metal such as aluminum, stainless steel, brass, or any other metal used in consumer goods. Other materials such as hard extruded plastic may also be used. The cover has a base 6 that is permanently or semi-permanently attached to the surface of the product having the camera (such as a cellphone, a laptop, a computer tablet, or another consumer electronic device with a built-in camera). The base 6 may be secured to the product by an adhesive. Alternatively the base 6 may be secured to the product by screws, bolts, or other fasteners.

Figure 1:
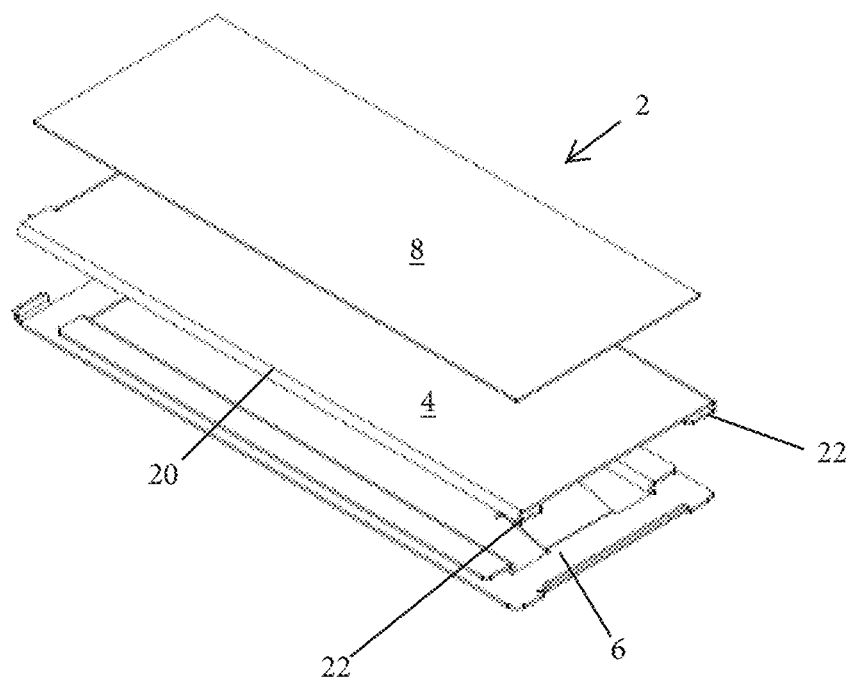
FIG. 1 depicts the base, cover, and exterior surface covering of a permanent camera cover, according to an embodiment of the invention.

FIG. 1 depicts the permanent camera cover 2 in an exploded view. The permanent camera cover 2 has a base 6, a cover 4, and an exterior surface covering 8.

Figure 2:
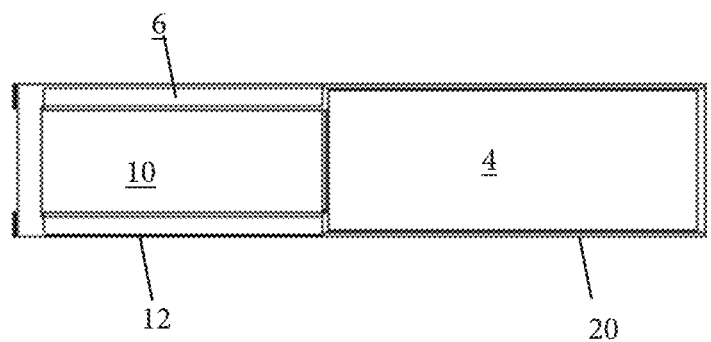
FIG. 2 depicts a top view of the base and cover of a permanent camera cover, according to one embodiment of the invention.

FIG. 2 depicts a top view showing the base 6 with the cover 4 next to the base 6 in an open position. The base 6 is a thin, flat, rectangular plate 12 with an aperture 10 in the middle that fits around the camera when secured to the device. The aperture 10 is preferably at least ¼ inch by ½ inch in size, such that it fits over most current camera sizes in consumer electronics products. The aperture 10 may also be sized depending on the size of the camera in the product, if other non-standard camera sizes are used. Alternatively the aperture 12 may be significantly larger in width and length than the camera to which the product is attached.

Figure 3:
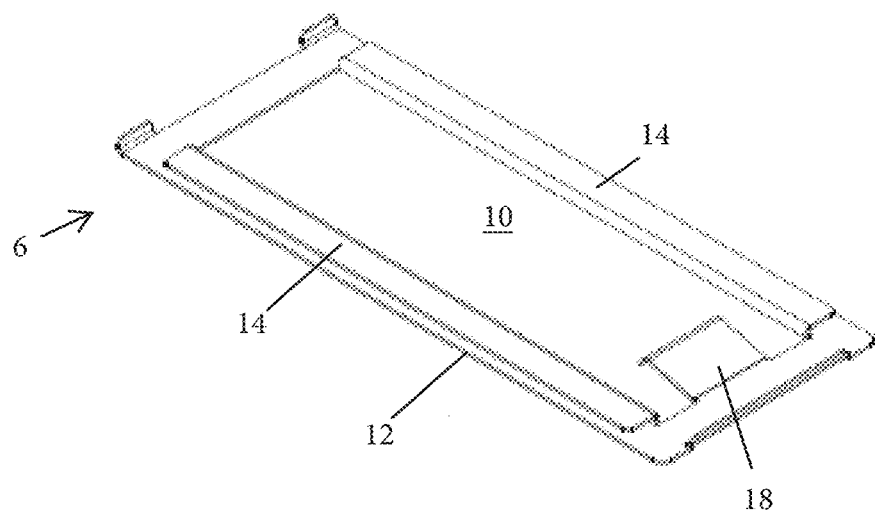
FIG. 3 depicts a perspective view of a base according to one embodiment of the invention.
Figure 4:
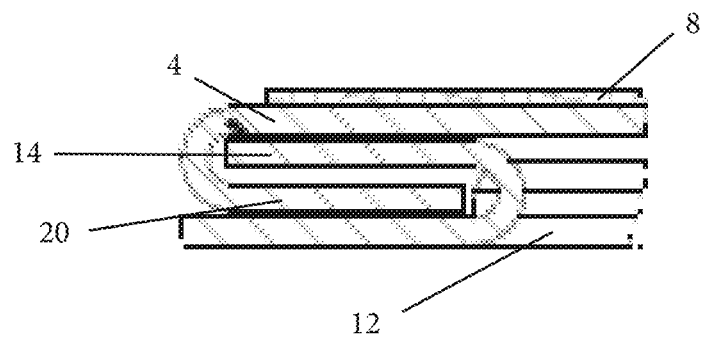
FIG. 4 depicts a cross section view of a hook and groove sliding engagement of the base and cover, according to one embodiment of the invention.

FIG. 3 depicts the base 6 in further detail. interlocking mechanism The base 10 is shown as a rectangular plate 12 with the aperture 10. Alongside the aperture 10 the plate 12 includes two parallel flanges 14, which rise up a short distance from the base and then extend outwardly toward the long side of the base, parallel to the base. A cross section of these flanges 14 are shown in FIG. 4 and further described below. This forms a groove 16 on each side of base, underneath the flanges 14. The base 6 also has a tab 18 extending inwardly toward and over the aperture 10. The tab 18 rises up higher that the flanges 14 and acts as a leaf spring. As described further below with respect to FIG. 5.

Figure 5:
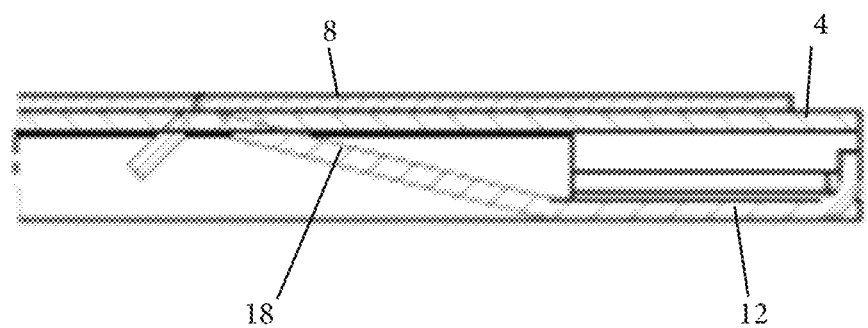
FIG. 5 depicts a cross-section of a tab on the base and the applied cover, according to an embodiment of the invention.

The cover 4 may be slid over the base 6 and locked in place. The cover 4 is also a thin, flat rectangular plate having similar dimensions to the base. The two longer edges 20 of the cover 4 are curved under and inward towards the backside of the cover at a 180 degree turn to form a hook 22. The hooks 22 are sized to fit within the grooves 16 on the edges of the base 6. The cover 4 can thus be slid into the base 6 by passing the hooks 22 horizontally through the grooves 16. FIG. 4 depicts the interlocking configuration of a hook 22 and a groove 16 when engaged after the cover 4 is slid into position over the base 6. When the cover 4 contacts the tab 18, the tab 18 depresses and creates a normal force against the cover 4, thereby holding it in place when the cover is applied. FIG. 5 depicts the tab 18 pressed against the cover 4 when the cover 4 is positioned over the base 6.

The exterior surface covering 8 can be plain, or it can have a decorative surface attached to it, applied on it, or integrated into it. For example, the cover can have a design, a surface for writing a note, a whiteboard surface, mirror, or other preferred surface for customizing the appearance of the cover 4. The exterior surface covering 8 may also be removable by the user, so that the user can change out the covering 8 as desired. In such cases, the covering 8 may be attached to the cover 4 by a magnet backing, re-usable adhesive, clips, or other detachable fasteners.

In order to fit within a device having a cover or closure, the entire permanent camera cover 2 may have a total thickness of no more than 1 millimeter. It has been found that the preferred way to do this is to manufacture the pieces using a stamping process to provide materials at the appropriate size. The product may also be produced by milling or extruding the pieces.

In addition, other embodiments are also possible. In some embodiments, the base and cover may be magnetic may stick together without the need for mechanical fastenings.

In other embodiments, the base may have a socket that receives a small tab or projection on the cover. In such embodiments, the user could push the cover onto the base, such that the tab or projection pops into the socket. The cover may then be popped out of the socket to be removed.

In other embodiments, the base may have depressible clips placed along the side of the base. When the cover is placed over the base, the clips may be pressed inward to engage and hold the cover.

In other embodiments, the cover may have a lip, and the base may have a track. The lip of the cover fits within the track of the base. When held at a specific angle, the lip may be withdrawn from the track, such that the cover may be removed.

In other embodiments, the cover may be slightly oversized relative to the base and apply as a press-on cover with a lipped edge that engages the sides of the base.

In other embodiments, the cover and base may have raised edges at one end that have holes passing through, such that a pin or hinge may pass through the holes. The pin may be removable (that is, so it acts like a cotter pin to lock or unlock the cover), or it may be permanent, such that the cover is rotatable around the pin as a hinge.

In other embodiments, the base and/or the cover may have suction cops that engage the other element when pressed down upon each other.

In other embodiments, the base and/or cover may have a tacky non-permanent adhesive that can hold the cover to the base, allow for the cover to be removed when pulled off by the user, and be reapplied as needed.

In other embodiments, hook-and-loop fasteners (such as those sold under the trade name VELCRO®) may be applied to the cover and the base.

What is claimed is:

1. A covering product for a mobile device having a camera, the covering product comprising:
    a base applied to the mobile device, the base having an aperture sized to fit around the camera, a first flange and a second flange parallel to each other, and a tab extending over the aperture;
    a cover comprising a first hook configured to engaged with the first flange and a second hook configured to engage with the second flange when the cover is engaged with the base; and
    an exterior surface covering having an ornamental surface and detachable from the cover.

\* \* \* \* \*